Oct. 17, 1967  E. B. KATZENMEYER  3,347,406
FUEL TANK
Filed Nov. 15, 1965

INVENTOR.
EDWIN B. KATZENMEYER
BY Joseph Januszkiewicz
ATTY.

United States Patent Office 3,347,406
Patented Oct. 17, 1967

3,347,406
FUEL TANK
Edwin B. Katzenmeyer, Akron, Ohio, assignor to B. F. Goodrich Company, New York, N.Y., a corporation of New York
Filed Nov. 15, 1965, Ser. No. 507,815
5 Claims. (Cl. 220—22)

This invention relates to a fuel tank and more particularly to a fuel tank having a flexible diaphragm for use with an automotive vehicle.

It has been the customary practice in the storage of gasoline for automobiles to provide a one-piece gasoline tank which was strapped or otherwise secured to the frame of an automobile. The chamber tank would have a pair of openings, one of which provided the opening for the supply of gasoline thereto and the other was connected to the carburetor of the automobile. A disadvantage of such a tank is that air enters the tank permitting the condensation of moisture therein causing difficulty in the operation of the fuel system. Other problems which arise from such a tank are the entrapment of fuel vapor, and blow back of fuel vapors when filling the tank.

The present invention contemplates the use of a flexible diaphragm which divides the fuel tank into two non-communicating compartments such that the one compartment is vented to atmosphere and the other compartment has (a) a connection to the combustion chamber of a gasoline engine via the carburetor and (b) an opening which is capped for the control of admission of additional fluids to the tank. In addition, such tank eliminates moisture and condensation entrapment as well as vapor entrapment. Such tank provides a positive pressure fuel system as well as eliminating fuel tank blow back when filling the tank since the vapor space is eliminated.

An object of this invention is to provide a fuel tank that permits easy maintenance and repair.

A further object of this invention is to provide a positive pressure fuel system.

Still another object of this invention is to provide a fuel tank that eliminates moisture and vapor entrapment problems which arise in the conventional fuel tank for automobiles.

A still further object of this invention is to provide a fuel tank which will operate in either a vertical or horizontal attitude.

These and other objects of the invention will become more apparent upon consideration of further details of the invention of the preferred embodiment thereof, when taken in conjunction with the following drawings in which.

Figure 1:
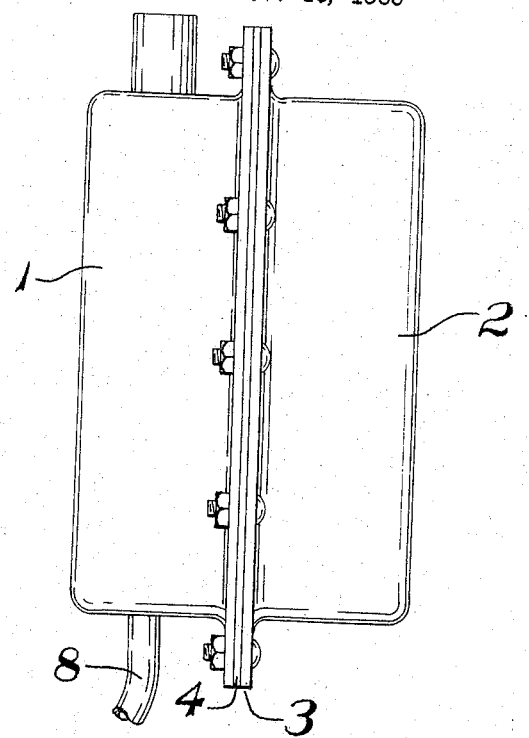
FIG. 1 is an elevational view of the fuel tank constructed in accordance with the present invention.

Referring now to the drawings wherein like reference characters designate like or corresponding parts, there is shown in FIG. 1 an apparatus which includes two half sections 1 and 2 bolted or otherwise secured together as by an adhesive as at 3. A flexible membrane or diaphragm 4 has its marginal edges clamped or suitably adhered to the respective half sections 1 and 2 of the tank to form a tight joint therebetween. Such diaphragm 4 divides the interior of the tank into a pair of compartments 5 and 6, which compartments are non-communicating. The one compartment 5 is provided with an opening 7 to afford the venting of such compartment 5 to atmosphere. If desired such opening 7 may be connected to a controlled pressure source to provide selective positive pressure in compartment 5 on diaphragm 4. The other compartment 6 is provided with a conduit 8 having an opening 9 which is adapted to communicate such compartment 6 with the carburetor and combustion chambers of the automobile engine. Compartment 6 is also provided with an opening 10 that communicates such compartment 6 with a conduit 11 that is secured to the rear portion of the automobile frame to provide access to such compartment 6 for filling such compartment 6 with fuel.

Figure 2:
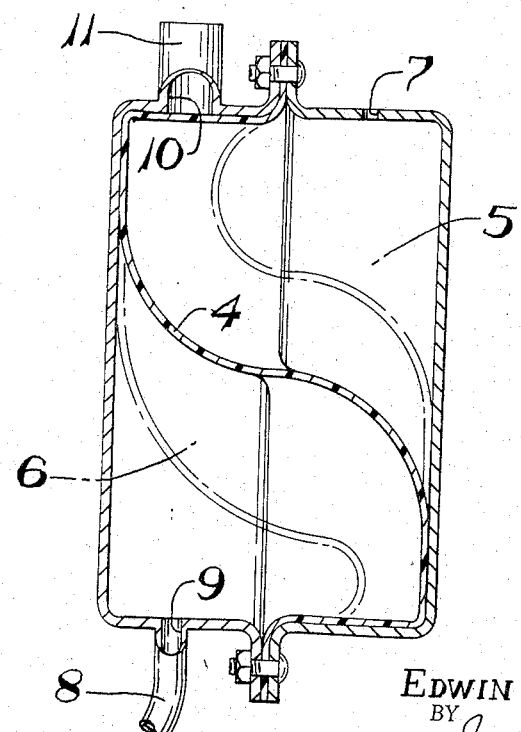
FIG. 2 is a cross sectional view of the fuel tank.

In use, the gasoline liquid or such fuel is introduced into compartment 6 via conduit 11 through opening 10 so as to substantially fill such compartment, forcing the diaphragm 4 (rightwardly as viewed in FIG. 2) against the wall of the one compartment 5. The air in compartment 5 will be vented to atmosphere via opening 7 to the extent to which diaphragm 4 is forced into such compartment 5. As the gasoline is used to propel the automotive vehicle, the level of liquid in compartment 6 will fall with diaphragm 4 following the liquid. Vent opening 7 provides for the entrance of air under atmospheric pressure to maintain diaphragm 4 in contact with such liquid. Since such diaphragm 4 maintains positive contact with the gasoline, air entrapment in compartment 6 is eliminated and the subsequent accumulation of moisture and condensation is thereby eliminated. In addition, no fuel vapor entrapment will occur since there is a positive pressure on the diaphragm 4 from the atmosphere or if desired a pressure source which maintains compartment 6 completely filled at all times with the gasoline thus eliminating fuel vapor emission. The movement of diaphragm 4 between the end wall of the half sections 1 and 2 is illustrated in the solid lines and phantom lines in FIG. 2.

From the foregoing description, it will be seen that efficient means are provided for carrying out the objects of the invention.

Obviously many modifications and variations of the present invention are possible in the light of the above teachings. It is therefore to be understood, that within the scope of the appended claims, the invention may be practiced otherwise than as specifically described.

I claim:

1. A fuel tank for a vehicle comprising a tank for storing liquid for use in powering such vehicle, a flexible diaphragm dividing the interior of said tank into two separate chambers, outlet means connected to one of said chambers to facilitate the filling and removal of fuel therefrom, and vent means connected to the other of said chambers for communicating said other chamber with the atmosphere to provide a positive pressure to said one chamber.

2. A fuel tank for a vehicle comprising a tank for storing liquid for use in powering a vehicle, a flexible diaphragm dividing such tank into a pair of chambers, one of said chambers having a vent opening communicating with the atmosphere, the other of said chambers having a pair of outlet means, one of said outlet means communicating said other chamber with the carburetor of an automotive engine, and the other of said outlet means having a cap thereon to provide access for the admission of liquid fuel into said other chamber.

3. A fuel tank for a vehicle as set forth in claim 2 wherein said tank comprises a pair of half sections, said flexible diaphragm being inelastic and secured at its marginal edge between said sections dividing such tank into said pair of chambers, and said one of said pair of outlet means being located at the lowermost end portion facilitating the withdrawal of liquid therefrom.

4. A fuel tank as set forth in claim 3 wherein the juncture of said half sections with said marginal edge of said diaphragm lies in a vertical plane, and with said pair of outlet means at opposite ends of said tank.

5. A fuel tank for a vehicle comprising a tank for storing liquid for use in powering such vehicle, a flexible diaphragm dividing the interior of said tank into two separate chambers, one of said chambers having a vent opening to atmosphere, the other of said chambers having at least a pair of outlet means, one of said outlet means located at the uppermost end portion of said tank to facilitate the filling of said tank with fuel, and the other of said outlet means located at the lower portion of said tank to facilitate the removal of fuel from said tank.

References Cited

UNITED STATES PATENTS 3,043,465   7/1962   Horner _____ 220—85

FOREIGN PATENTS 948,675   2/1964   Great Britain.

DONALD F. NORTON, *Primary Examiner.*

JAMES B. MARBERT, *Examiner.*

Disclaimer 3,347,406.—*Edwin B. Katzenmeyer*, Akron, Ohio. FUEL TANK. Patent dated Oct. 17, 1967. Disclaimer filed June 12, 1968, by the assignee, *The B. F. Goodrich Company*.

Hereby enters this disclaimer to claim 1 of said patent.
[*Official Gazette October 8, 1968.*]